June 29, 1943.  J. J. CARMO  2,323,117
POULTRY FEEDER
Filed Jan. 17, 1942
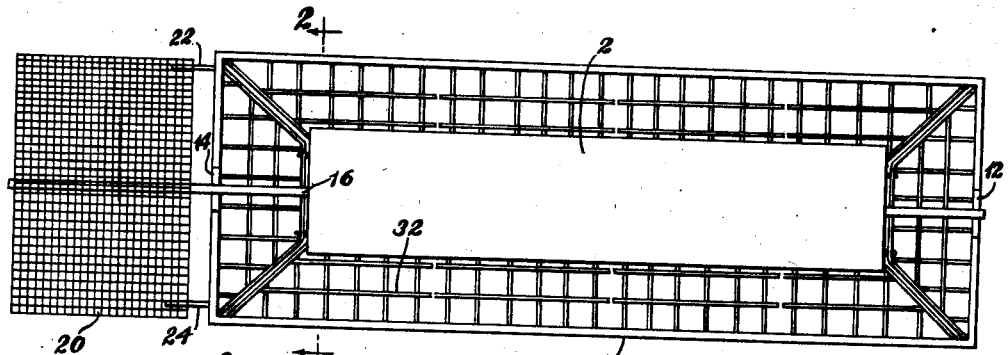
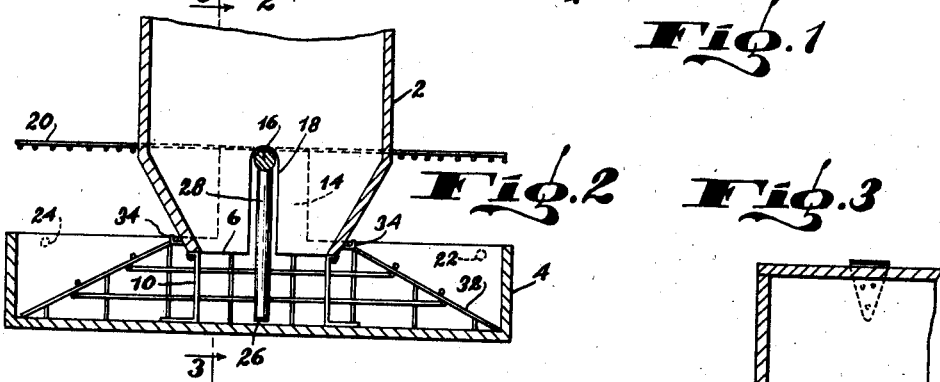
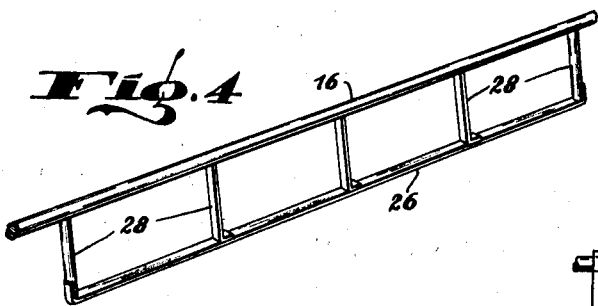
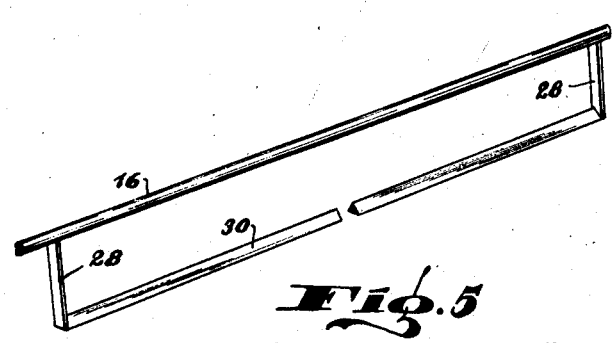
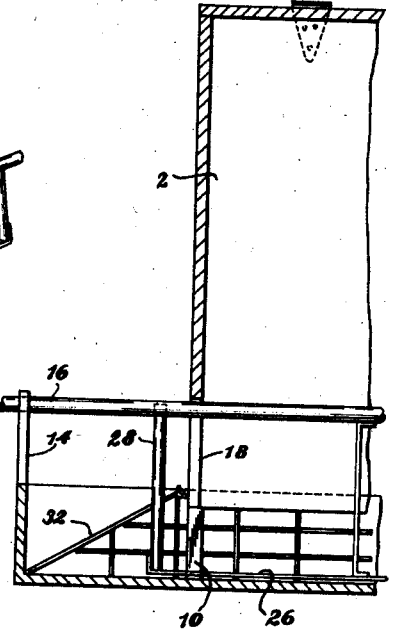
Inventor
John J. Carmo
By
C. Yardley Chittick
Attorney Patented June 29, 1943

2,323,117

UNITED STATES PATENT OFFICE 2,323,117

POULTRY FEEDER

John J. Carmo, Billerica, Mass.

Application January 17, 1942, Serial No. 427,097

7 Claims. (Cl. 119—55)

This invention relates to poultry feeders and has as its primary object the provision of a hopper that may contain a substantial quantity of feed and mechanism operated by the birds or chicks, as the case may be, which will cause the feed to flow in limited quantities to a surrounding feed trough where it will be available to the poultry.

A further object of the invention is to provide agitating means which will cause the feed to flow in such limited quantities that the depth of the feed in the trough will be limited so much so that in the normal course of feeding the birds will be enabled to eat all of the feed that flows from the hopper and not merely the top layer.

Another object of the invention is the provision of an agitator, simple in construction and cheap to manufacture, which may be operated by chicks as well as full-grown birds. This necessitates an agitator requiring only a small force to move it through the feed, but located in such position that movement thereof will be successful in causing the proper lateral flow of the feed from the hopper into the trough.

A still further object of the invention is the provision of an agitator which will automatically cease causing lateral flow of the feed when the depth of the feed in the trough reaches a predetermined point, even though movement of the agitator may be continued.

Another object of the invention is the provision of a removable grillwork, overlying the feed in part, which is designed to prevent or at least discourage the birds from climbing into the trough, but at the same time in no way limiting their ability to get at the feed with their beaks.

These and other objects of the invention will become more apparent as the description proceeds with the aid of the accompanying drawing, in which:

Fig. 1 is a plan view of a poultry feeder including the present invention.

Fig. 2 is an enlarged partial section on the line 2—2 of Fig. 1.

Fig. 3 is a section on the line 3—3 of Fig. 2.

Fig. 4 shows a preferred form of agitator.

Fig. 5 shows a modified form of agitator.

Referring to Fig. 1, a feed containing hopper 2 is mounted in vertical position over a trough 4, which trough may be of any convenient dimensions with respect to the hopper. In this case the trough extends beyond the hopper in all directions so that the birds may feed on all four sides.

As can be seen in Fig. 2, the open bottom end 6 of hopper 2 is reduced in width as compared with the upper body, but the dimensions of the upper part of the hopper may be varied at will, depending upon how much feed is to be contained therein.

The hopper is mounted with its open lower end a short distance above the bottom 8 of trough 4 in any convenient manner. In the present instance, it is shown as supported on legs 10, of which there are a suitable number to supply the necessary rigidity.

The height of the wall of the trough is sufficient to confine the feed but at the same time low enough so that the birds will have no difficulty in reaching thereover.

At both ends of the trough are raised supports 12 and 14, made in any convenient manner, which carry a longitudinally extending bar or rod 16. This rod passes through the entire length of the hopper 2, gaining admission thereto through the slots 18, of which there is one at either end.

One end of shaft 16 extends beyond trough 4 a distance sufficient to permit the mounting thereon of a platform 20 large enough to permit a single bird walking thereon. A pair of stops 22 and 24 extend outwardly from the platform end of trough 4 so as to limit the rotative movement of the platform.

Connected to shaft 16 by a plurality of connecting bars 28 is an agitator bar 26. This bar is of special design and is located in such position with respect to the bottom of the trough that, when it is moved under the influence of a bird walking on the platform, the feed will be disturbed sufficiently to move laterally toward the trough walls in a limited but sufficient amount for feeding purposes. The agitator bar in the preferred and modified forms construction is plainly shown in Figs. 2, 3, 4 and 5. If stops 22 and 24 should be omitted, the engagement of agitator bar 26 with legs 10 will have the same effect in limiting the angle through which platform 20 can move.

Agitator 26 is located very close to the bottom of the trough and its vertical dimension is small. This arrangement accomplishes a special result which is not achieved by poultry feeders known to the prior art.

Chicken feed as it is now commonly sold consists of granular material of small grain size. If the bottom of the hopper is too far above the bottom of the trough, the feed will escape too freely, causing in many cases an overflow of the trough walls and in any event presenting a very deep quantity of feed in the trough. This is undesirable for the reason that the birds eat the top layer only of the feed, never reaching the bottom. Thus the bottom quantity becomes stale and unappetizing and is consequently wasted.

On the other hand, if the bottom of the hopper is close enough to the bottom of the trough to prevent free escape of the feed, then agitating means of some sort must be provided to cause replacement in the trough of the eaten feed.

With the agitators of the prior art, continued movement thereof, caused by birds walking on platforms connected therewith, results in a continual increase in feed at the trough sides so that the depth thereof increases undesirably unless it is consumed in sufficient quantity by the birds.

Through the use of the agitator of the present invention, however, the flow of feed to the sides of the trough automatically ceases when the feed has achieved a predetermined depth, even though movement of the agitator may be continued indefinitely thereafter. That is to say, until the birds eat and thereby decrease the level of the feed in the trough sides, there will be no further movement of feed from the hopper.

The shape of the agitator bar 26, which is of relatively small vertical dimension, causes sufficient agitation and disturbance of the granular feed to induce flow from the hopper, but as resistance to outward flow is developed as the depth of feed in the trough increases, the agitator bar 26 can thereafter be moved transversely through the feed without causing any further lateral flow. The action that takes place is much the same as the movement of a thin bar through sand, in which situation the sand appears to divide before the advance of the bar and then close in behind without any substantial displacement of the sand as a whole.

The general relationship of the parts, as disclosed in Figs. 2 and 3, has been found particularly desirable for use with typical poultry feed. The length of the connecting bars 28 is substantially greater than the distance from the trough bottom to the lower edge of the hopper so that relatively small angular movements of platform 20 will cause adequate transverse movement of agitator bar 26. If on the contrary shaft 16 were lowered to a point where connecting bars 28 were shorter than the distance between the trough bottom and the lower edge of the hopper, then such movement of agitator bar 26 as might be caused by birds walking on platform 20 would be inadequate to disturb the feed sufficiently to cause the necessary outward flow when the feed level in the trough had been lowered.

By having agitator bar 26 very close to the bottom, no dead spots accumulate and all of the feed is progressively transferred from the hopper to feeding position. This insures economy of operation and maintenance of a shallow layer of feed which will be consumed in its entirety, eliminating completely the accumulation of a stale layer of feed in the trough.

A variation of the agitator bar construction is shown at 30 in Fig. 5. Here the cross-sectional shape is triangular, but it will be appreciated that this wedge-shaped formation will likewise pass easily through the feed without compelling lateral displacement thereof after the necessary resistance to further lateral movement has been built up by the previous distribution of feed to the trough sides.

The agitator bar may assume other cross-sectional forms so long as it is small enough to travel back and forth through the feed in the manner heretofore described.

In order to discourage birds from walking within the confines of the trough, a series of coarse screens has been provided, as at 32 in Figs. 1, 2 and 3. These may be made in short sections as shown and maintained in place by hooks 34, which may be positioned at convenient intervals about the lower part of the hopper. The outer edges of screens 32 rest on the bottom of the trough. If the outer ends of the screens are at the juncture of the trough bottom and walls, the screens will stay in the positions shown. If, however, the outer ends terminate inwardly of the walls, then the screens, if of sufficiently light material, will swing upwardly and partially float on the feed. The screens may be quickly removed for cleaning purposes, and if considered desirable, may be omitted entirely. The size of the apertures through the screens is sufficient to permit the feed to flow therethrough and the birds to feed without difficulty.

The dimensions of a feeder which I have found satisfactory are as follows. The bottom of the hopper should be about 1⅛ in. above the bottom of the trough, the distance across the mouth of the hopper should be about 2 in., and the distance from the bottom edge of the hopper to the trough side about 3 in. The agitating bar should be approximately $\frac{1}{16}$ to ⅛ of an inch from the bottom of the trough, and the supporting bars connecting the agitator bar to the platform shaft should be about 2½ in. long. A feeder so proportioned and using typical ground chicken feed will accomplish the results set forth above. It should also be noted that, while the principal feeding areas are at the side, the feed will also be induced to run endwise into the end areas of the trough to provide additional feeding space.

It is to be understood that the present invention performs in the intended manner only when certain kinds of feed are used therewith. The general description of the kind of feed that I have found is moved in the intended manner by the agitator is called mash and may be of any of the principal types of mesh: namely, laying mash or egg mash, chick mash or starting mash, and growing mash. Chicken mashes are of complicated physical structure in that they are composed of a large number of ingredients ground to small grain size and finally mixed together. Because of the physical properties of the different materials, the resultant mix has flow characteristics which are peculiar to this type of product. It is impossible to describe the grain size as being between any particular limits because of the varying ingredients and the grain sizes to which they are customarily ground. In general, however, the size of the grains of the smaller materials varies from .003 to .010 inch, but there is a certain amount of larger particles that comes from materials such as the husks of bran and the fairly long fibers from oats. These larger particles tend to retard the free flow of the smaller particles by providing a group of irregularly disposed, relatively large-sized elements within the mash.

A typical formula of mash that I have found to flow satisfactorily under the influence of my agitator is that manufactured by Eastern States Farmers' Exchange, of Springfield, Massachusetts, which consists of the following per ton of material:

| | Pounds |
|---|---|
| Wheat bran | 300 |
| Yellow corn meal | 280 |
| Ground oats | 249.5 |
| Wheat flour middlings | 240 |
| 50 per cent protein meat scraps | 200 |
| Ground barley | 160 |
| Cane molasses | 120 |
| 41 per cent protein soybean oil meal | 100 |
| 58 per cent protein fish meal | 100 |
| Alfalfa leaf meal | 80 |
| Oyster shell meal | 80 |
| Corn gluten meal | 60 |
| Iodized salt | 20 |
| Fortified sardine oil | 10 |
| Manganese sulphate | .5 |
| Eastern States mash | 2000 |

The foregoing detailed description of the mash is given as the inventive feature of applicant's structure resides in the relationship of the dimensions of the agitator bar to the feed. It is the size of the agitator bar, coupled with the particular consistency of the feed, that results in suitable flow into the trough. The internal resistance afforded by the particular physical structure of the mash, of which the above Eastern States formula is a typical example, provides the necessary resistance to outward flow of more mash than is needed to cover adequately the bottom of the trough until such time as the exposed feed has been eaten. The resistance of the of the mash in the trough sides when at the intended depth is great enough so that continued movement of the agitator does not cause further movement of the mash, as would be the case where agitator bar structures of the prior art were used.

By experimentation I have found that a flat agitator bar of as thin vertical dimension as it can conveniently be made, and of a width great enough to provide the necessary rigidity so that, when the agitator bar is moved through the feed, it will not bend or be unduly distorted, produces the desired agitation of the chicken mashes in question.

An agitator bar as narrow as one-quarter inch and as little as .010 of an inch thick, that is, in vertical dimension, acts satisfactorily. I have also determined that an agitator bar as wide as one-half inch and .020 of an inch thick in vertical dimension likewise produces the desired agitation. Furthermore, I have determined that a round wire agitator bar may be used satisfactorily in sizes up to .125 of an inch in diameter. When the agitator bar becomes of much greater vertical dimension than this last figure, as are the disclosures of the prior art, an excessive amount of mash will be driven from the hopper to produce too deep a layer in the trough, and when the vertical dimension becomes sufficiently great, feed will be forced from the hopper so long as the agitator bar is moved, regardless of the depth of the feed in the trough, in which case overflow of the trough is likely to occur.

It will be understood, of course, that the vertical dimension of the agitator bar may be of any vertical dimension up to the aforesaid limit of about .125 of an inch. The cross-sectional shape may likewise be altered to assume the form of a triangle, diamond, oval or any other shape desired so long as the configuration will not result in continuous flow of feed to the trough after the desired depth has been achieved, even though the agitator may remain in movement under the influence of chickens walking on the platform.

I claim:

1. A poultry feeder comprising a trough, a hopper for containing chicken mash of the type described, said hopper positioned over said trough and spaced therefrom such distance that feed of the type described and contained therein will not flow of its own accord to the sides of the trough, an agitator bar extending lengthwise of said trough and under the bottom opening of said hopper, said agitator bar located close to the bottom of the trough, a platform, means connecting said platform to said agitator bar so that oscillating movement of said platform will cause oscillating movement of said agitator bar, the shape of said agitator bar being such that, when moved through feed of the type described, lateral flow of the feed will be induced until a determinable quantity of it has flowed into said trough, after which continued oscillating movement of said agitator bar through said feed will cause no further flow of said feed into said trough.

2. A poultry feeder comprising a trough and a hopper for containing feed of the type described positioned thereabove, the distance from the bottom of said hopper to the bottom of said trough being such that the flow of said feed from said hopper to the trough will be inadequate unless said feed is agitated, and agitating means to induce further flow of feed into said trough, said agitating means comprising a longitudinally extending bar of such shape as to afford limited resistance to movement through said feed and positioned close to the bottom of said trough, a shaft extending longitudinally of and within said hopper a substantial distance above the bottom of said hopper, means connecting said agitating bar to said shaft, and a platform mounted on said shaft whereby oscillating movement of said platform will cause a substantial oscillating movement of said agitating bar, the movement of said agitating bar as induced by birds walking on said platform being sufficiently extensive to disturb the feed and thereby cause flow from said hopper to said trough until the feed has reached a predetermined depth, the resistance of said feed to further flow after reaching said predetermined depth being such as to permit thereafter continued movement of said agitating bar through said feed without resulting in further movement of feed into said trough from said hopper.

3. A poultry feeder comprising a trough and an open bottom feed hopper positioned thereabove, the distance from the bottom of said hopper to the bottom of said trough being such that chicken mesh of the type described positioned within said hopper will not flow of its own accord in adequate quantity to a feeding position on the bottom of the trough, an agitator under the hopper opening and positioned close to the bottom of said trough, the shape of said agitator being such that, upon transverse oscillation through the feed, the feed will be disturbed sufficiently to flow toward the sides of the trough in greater amount than would otherwise be the case, and that continued oscillating movement of said agitator when a determinable amount of feed is in the sides of said trough will not induce further movement of feed into the sides of said trough, and means including a platform connected to said agitator for causing oscillations of the agitator by a bird walking on said platform.

4. A poultry feeder comprising a trough and an open bottom feed hopper positioned thereabove, a shaft extending longitudinally of said hopper and located above the level of the lower opening of said hopper, an agitator bar extending generally parallel to said shaft and close to the bottom of said trough and connected to the shaft whereby oscillations of said shaft will cause oscillations of said agitator bar, a platform on said shaft whereby said shaft may be oscillated by a bird walking on said platform, the shape of said agitator bar being such that, when moved through feed of the type described in a transverse direction, it will disturb the granular structure of the feed sufficiently so as to induce flow thereof toward the sides of said trough until a determinable depth of feed has developed, and thereafter further movement of said agitator bar will not cause further flow of said feed into said trough.

5. A poultry feeder comprising a trough and an open bottom feed hopper positioned thereabove, a shaft extending longitudinally of said hopper and located above the level of the lower opening of said hopper, an agitator bar extending generally parallel to said shaft and close to the bottom of said trough and connected to said shaft, and a platform connected to said shaft whereby oscillations of said platform caused by a bird walking thereon will cause oscillations of said shaft and agitator bar, said feeder being designed for use with chicken mesh of the type described, and said agitator bar having a vertical dimension not greater than .125 inch.

6. A poultry feeder for presenting a layer of feed of limited depth, comprising a trough and an open bottom feed hopper positioned thereabove at a distance between one-half and one and one-half inches above the bottom of the trough, an agitator bar having a vertical dimension not more than .125 inch extending longitudinally of said trough close to the trough bottom, a shaft extending longitudinally of said hopper substantially parallel to said trough bottom and not less than one and one-half inches nor more than three and one-half inches above said agitator bar, means connecting said bar to said shaft, and a platform connected with said shaft of such dimensions that a bird walking thereon will create enough leverage to move said bar through chicken mash of the type described to induce flow of said mash until further flow is restrained by the development of a layer in said trough of said desired predetermined depth.

7. A poultry feeder comprising a trough, a hopper for containing chicken mash of the type described, said hopper positioned over said trough and spaced therefrom such distance that feed of the type described and contained therein will flow of its own accord an insufficient distance toward the sides of the trough for proper feeding of the poultry, an agitator bar extending lengthwise of said trough and under the bottom opening of said hopper, said agitator bar located close to the bottom of the trough, means exterior of said trough to which a bird may apply its weight, means connecting said exterior means to said agitator bar so that oscillating movement of said exterior means will cause oscillating movement of said agitator bar, the shape of said agitator bar being such that when moved through feed of the type described, lateral flow of the feed will be induced until a determinable quantity has flowed into said trough, after which continued oscillating movement of said agitator bar through said feed will cause no further flow of said feed into said trough.

JOHN J. CARMO.